(12) United States Patent
Prechner et al.

(10) Patent No.: US 10,484,819 B2
(45) Date of Patent: Nov. 19, 2019

(54) METHOD AND APPARATUS FOR ACCESS POINT LOCATION TOKEN

(71) Applicant: Intel IP Corporation, Santa Clara, CA (US)

(72) Inventors: Gaby Prechner, Rishon Lezion (IL); Elad Eyal, Shoham (IL); Yuval Amizur, Kfar-Saba (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/123,861

(22) PCT Filed: Mar. 31, 2014

(86) PCT No.: PCT/US2014/032400
§ 371 (c)(1),
(2) Date: Sep. 6, 2016

(87) PCT Pub. No.: WO2015/152884
PCT Pub. Date: Oct. 8, 2015

(65) Prior Publication Data
US 2017/0019762 A1 Jan. 19, 2017

(51) Int. Cl.
*H04W 4/02* (2018.01)
*H04W 64/00* (2009.01)
(Continued)

(52) U.S. Cl.
CPC ............. *H04W 4/023* (2013.01); *G01S 5/02* (2013.01); *G01S 5/0236* (2013.01);
(Continued)

(58) Field of Classification Search
CPC ... H04W 4/023; H04W 64/00; H04W 64/003; H04W 88/02; H04W 88/08; G01S 5/02; G01S 5/0236; G01S 5/0284
See application file for complete search history.

(56) References Cited

U.S. PATENT DOCUMENTS 8,886,833 B1* 11/2014 Kopikare .......... H04L 29/08351
709/227
9,741,237 B1* 8/2017 Knas .................... G06Q 90/205
(Continued)

FOREIGN PATENT DOCUMENTS

CN    1392491 A    1/2003
CN    1555014 A    12/2004
(Continued)

OTHER PUBLICATIONS

Notice of Allowance received for Taiwan Patent Application No. 104105404, dated Nov. 29, 2016, 3 pages including 1 page of English Translation.
(Continued)

*Primary Examiner* — Mehmood B. Khan
(74) *Attorney, Agent, or Firm* — Spectrum IP Law Group LLC

(57) ABSTRACT

The disclosure generally relates to a method and apparatus for using a location token to locate a mobile device in a mapped environment. In one embodiment, the disclosure relates to identifying an AP in the environment using an AP location token. By finding a map from a map vendor which has a substantially identical map token, the AP and the map may be matched together. Once the AP is matched to the map, its exact location will be known. The location of a mobile device may be determined in relation to the AP's location. The same process may be used to identify the location of several APs on a map and thereby identify the location of the mobile device relative to the APs.

25 Claims, 6 Drawing Sheets

(51) Int. Cl.
*G01S 5/02* (2010.01)
*H04W 88/02* (2009.01)
*H04W 88/08* (2009.01)

(52) U.S. Cl.
CPC ........... *G01S 5/0284* (2013.01); *H04W 64/00* (2013.01); *H04W 64/003* (2013.01); *H04W 88/02* (2013.01); *H04W 88/08* (2013.01)

(56) References Cited

U.S. PATENT DOCUMENTS

| | | |
|---|---|---|
| 2002/0193943 A1 | 12/2002 | Hennelly |
| 2009/0149201 A1 | 6/2009 | Ryu et al. |
| 2011/0294516 A1 | 12/2011 | Marshall et al. |
| 2012/0136623 A1* | 5/2012 | Edge ................ G01S 5/0284 702/150 |
| 2013/0170383 A1 | 7/2013 | Cho et al. |
| 2013/0257657 A1 | 10/2013 | Garin et al. |
| 2014/0077998 A1 | 3/2014 | Amizur et al. |
| 2015/0143516 A1* | 5/2015 | Sharpe ................ H04L 63/1441 726/22 |

FOREIGN PATENT DOCUMENTS

| | | |
|---|---|---|
| CN | 102645221 A | 8/2012 |
| CN | 103154764 A | 6/2013 |
| TW | 201350795 A | 12/2013 |
| WO | 2015152884 A1 | 10/2015 |

OTHER PUBLICATIONS

Office Action received for Taiwan Patent Application No. 104105404, dated Mar. 9, 2016, 6 pages (1 page of English Translation and 5 pages of Official copy).

International Preliminary Report on Patentability and Written Opinion Received for PCT Application No. PCT/US2014/032400, dated Oct. 13, 2016, 8 pages.

International Search Report with Written Opinion received for PCT Application No. PCT/US2014/032400, dated Dec. 17, 2014, 11 pages.

Office Action received for Chinese Patent Application No. 201480076108.7, dated Dec. 28, 2018, 9 pages.

Office Action received for Chinese Patent Application No. 201480076108.7, dated Jun. 4, 2019, 11 pages.

\* cited by examiner

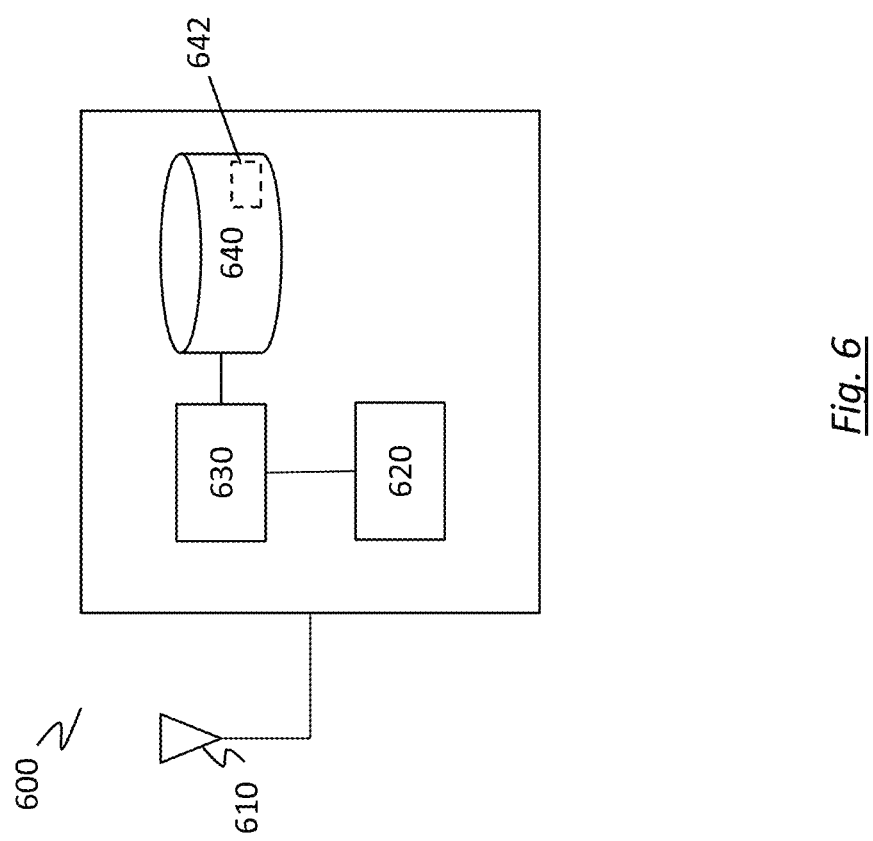

METHOD AND APPARATUS FOR ACCESS POINT LOCATION TOKEN

BACKGROUND

Field

The disclosure relates to a method, apparatus and system to improve position determination of a mobile device. Specifically, the disclosure relates to a method, apparatus and system to accurately determine position of a device inside a structure using location tokens that bind an access point to a corresponding map.

Description of Related Art

Outdoor navigation is widely deployed due to advancement in various global positioning systems (GPS). Recently, there has been an increased focus on indoor navigation and position location. Indoor navigation differs from outdoor navigation because the latter precludes receiving GPS satellite signals. As a result, effort is now directed to solving the indoor navigation problem. Conventional techniques have failed to provide an adequate scalable solution with satisfactory precision.

A solution to this problem may be based on the Time-of-Flight (ToF) measurement. ToF is defined as the overall time a signal propagates from the user to an access point (AP) and back to the user. This value can be converted into distance by dividing the signal's roundtrip travel time by two and multiplying it by the speed of light. This method is robust and scalable but requires significant hardware changes to the Wi-Fi modem and other devices. The ToF range calculation depends on determining the precise signal receive/transmit times as well as the exact location of the AP.

BRIEF DESCRIPTION OF THE DRAWINGS

These and other embodiments of the disclosure will be discussed with reference to the following exemplary and non-limiting illustrations, in which like elements are numbered similarly, and where:

FIG. 6 shows a system for implementing an embodiment of the disclosure.

DETAILED DESCRIPTION

Figure 1:
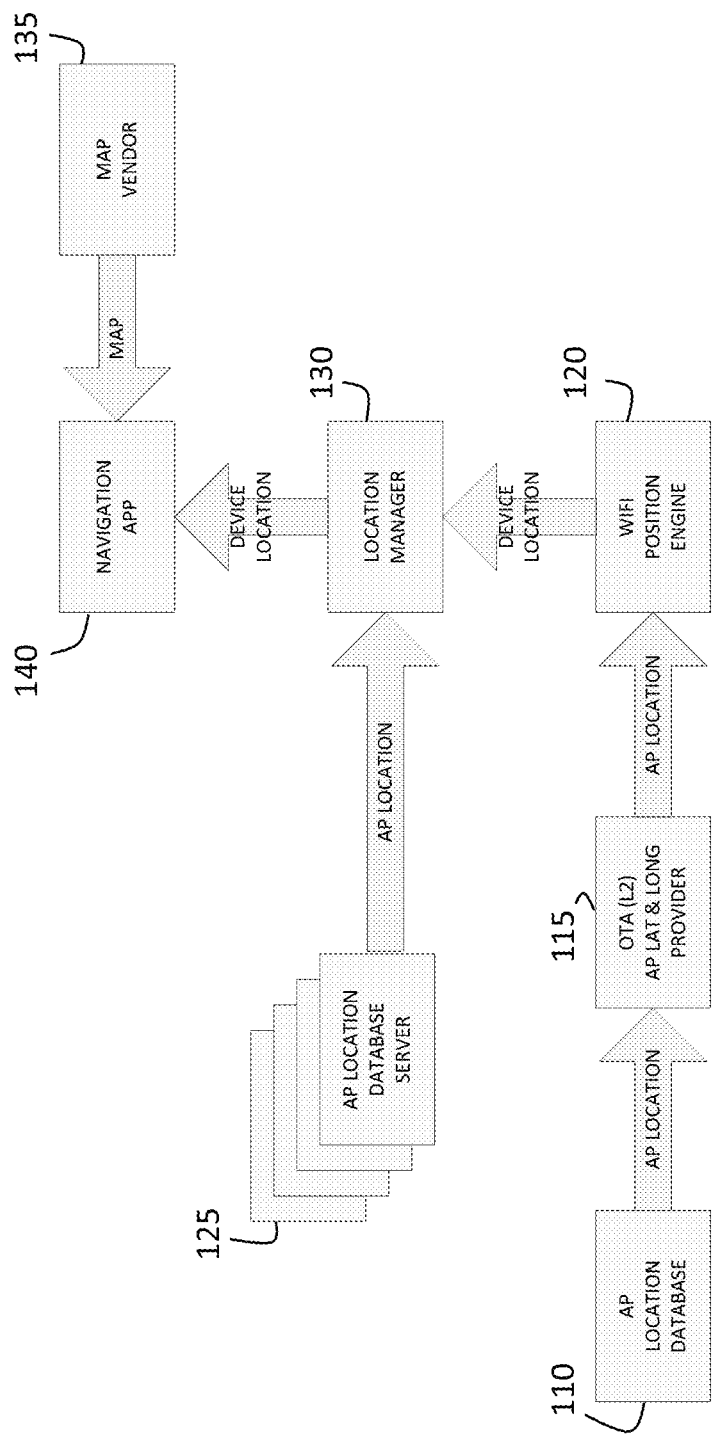
FIG. 1 shows information flow for a conventional location determination system.

Certain embodiments may be used in conjunction with various devices and systems, for example, a Personal Computer (PC), a desktop computer, a sensor device, a BT device, a BLE device, an Ultrabook™, a mobile computer, a laptop computer, a notebook computer, a tablet computer, a server computer, a handheld computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like. Some embodiments may be used in conjunction with devices and/or networks operating in accordance with existing Bluetooth standards ("the BT standards") as will be discussed further below, e.g., including BT specification V 1.0, Dec. 1, 1991, BT specification V 4.0, Jun. 30, 2010, and/or future versions and/or derivatives thereof.

Some embodiments may be used in conjunction with devices and/or networks operating in accordance with existing Institute of Electrical and Electronics Engineers (IEEE) standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (WiFi) Alliance (WFA)Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Outdoor navigation has been widely deployed due to the development of various systems including: global-navigation-satellite-systems (GNSS), Global Positioning System (GPS), Global Navigation Satellite System (GLONASS) and GALILEO. Indoor navigation has been receiving considerable attention. Indoor navigation differs from the outdoor navigation since the indoor environment is not capable of receiving signals from GNSS satellites. As a result, Conventional techniques do not offer a scalable solution with acceptable precision.

In one embodiment of the disclosure, the ToF method is used to address indoor navigation. As discussed above, ToF is defined as the overall time a signal propagates from the user to an AP and back to the user. The ToF value can be converted into distance by dividing the time by two and multiplying it by the speed of light. The ToF method is robust and scalable but requires hardware changes to the existing Wi-Fi modems.

An indoor device trying to self-locate needs to know the exact location and the infrastructure of the environment in which it is located. In outdoor navigation, the satellites' locations are used for trilateration or triangulation. In indoor navigation, location of the Wi-Fi AP may be used. However, new problems arise when seeking to locate an indoor object with precision. One such problem is due to misalignment between the AP location (needed for trilateration) and the available maps. Such misalignments create considerable error and degrade the user's experience.

FIG. 1 shows information flow for a conventional location determination system. Specifically, FIG. 1 shows that the AP location and the indoor map information (map) might come from different sources and cause misalignment. In the embodiment of FIG. 1, AP location database 110 represents the AP's location. As will be discussed in relation to FIG. 3, AP location database may reside at the network or at the AP. AP location database server 125 may be a database containing the location of some or all the APs in the environment. Map vendor 135 provides maps of the indoor locations housing the AP(s).

The process of FIG. 1 starts when AP location database 110 provides the AP's location to AP provider 115. AP provider 115 can combine this information with the AP's known latitude and longitude and forward the AP location information to Wi-Fi position engine 120. The Wi-Fi position engine may be integrated with the mobile device seeking to self-locate, or it may be an independent network application. The Wi-Fi position engine 120 estimates a position relative to the reported AP location and reports the estimated device location to location manager 130.

Location manager 130 may also receive known AP locations for one or more APs from AP location database server 125. The AP location database server 125 may contain the location of one or more APs servicing the environment.

The location manager 130 combines the information and reports it to the Wi-Fi position engine 120. The Wi-Fi position engine calculates the position relative to the APs and sends the calculated position back to Location manager 130. The Location manager may than report the calculated location to Navigation application (app) 140. Navigation app 140 may be a stand-along program or it may be part of the larger network. Navigation app 140, having received a map from map vendor 135 may then match the AP and device location to the map. The map and the AP may be used to location a mobile device in the environment.

The process of FIG. 1 is susceptible to significant error. Namely, if the APs' locations as reported by AP location database 110 and AP location database server 125 are not aligned to the map, the calculated device position will differ from the actual position on the map.

Figure 2:
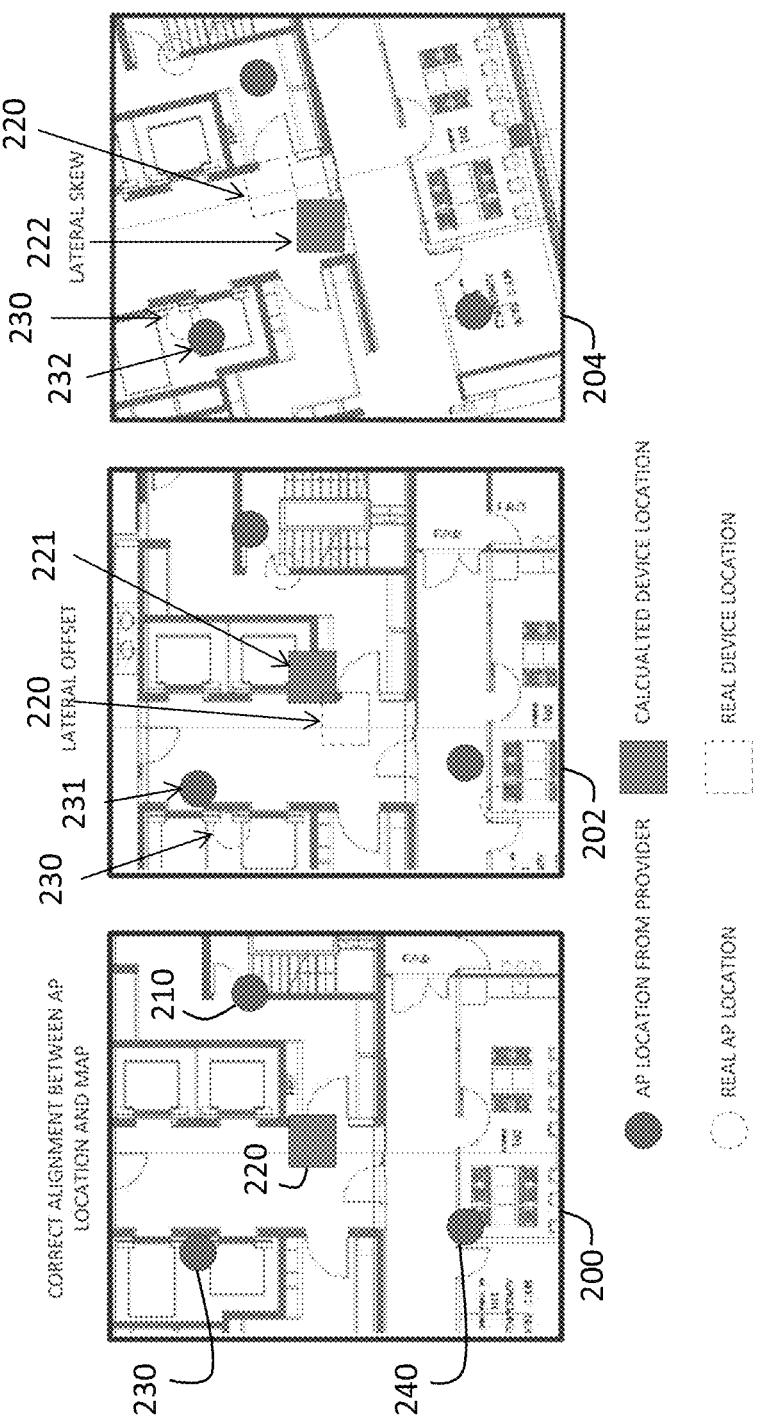
FIG. 2A shows proper alignment between the AP location and the indoor map.
FIG. 2B shows lateral offset between the reported AP location and the expected location on the map.
FIG. 2C shows lateral skew between the reported AP location and the expected location on the map.

FIGS. 2A-2C show alignment and misalignments in conventional indoor navigation techniques. Specifically, FIG. 2A shows proper alignment between the AP location and the indoor map. Here, AP locations 210, 212 and 214 are noted as circles on indoor map 200. AP locations 210, 230 and 240 may be provided by an AP location database (110, FIG. 1) and/or by an AP location database server (125, FIG. 1). The calculated device location 220 can be determined from ToF estimation and known AP locations.

FIG. 2B shows lateral offset between the reported AP location and the expected location on the map. Here, calculated device location 221 is laterally offset from the actual device location 220. Similarly, the calculated AP location 231 is laterally offset from real AP location 230. These offsets can cause location inaccuracy. The offset is due to misalignment between the AP location map (the location the AP considers itself to occupy on a map) and the indoor map. That is, the AP map and the vendor map may not be substantially identical or identically oriented.

FIG. 2C shows lateral skew between the reported AP location and the expected location on the map. Here, the AP location map and the indoor map are offset by an angle. As seen, calculated device location 222 shows an offset from actual device location 222. An offset is also seen for AP with actual location 230 which now appears at location 232. The offset is not only angular, but also includes physical location differences. While maps 202 and 204 show different offsets independently, the offsets may appear in one map. The offset can cause location inaccuracy, thereby degrading user's experience.

In one embodiment of the disclosure, the misalignment is addressed by selecting substantially the same AP location map and vendor map. In another embodiment, the map vendor and the AP location vendor provide token(s) to the location engine and to the navigation app. Each token is associated with one map and enables matching the AP, or several APs, with the correct map. The AP location is aligned to the map only if it uses substantially the same token as the map. This technique can also be used as a security measure such that only an authorized map vendor and/or application can use the AP location data.

A token can be a visual marker determined or placed on a map for location and/or alignment purposes. In one embodiment, the token can be a unique number which is the same for the map and the associated AP(s). A technique to align between different tokens can also be stored in a database. The token itself may not contain information other than whether the map is aligned to the AP or not. The token can be created by the map vendor and may define one or more data files. The token may be used to decipher the map. The token can also be used to orient and scale the map. One or more objects in the map can be used for orientation and scaling. Conventional techniques for generating a globally unique identifier (i.e., a token) may also be used.

In one embodiment, a token comprises a pseudorandom number which can be seeded on the Media Access Control (MAC) address of the system generating the token (e.g., an AP), and may be concatenated with date and time of creation. In another embodiment, a vendor-specific code can define the token. The vendor specific code may have its uniqueness guaranteed by a managing registrar such as IEEE. In an exemplary embodiment, the Wi-Fi position engine receives map tokens from two different sources and the AP location is aligned to the map only if it uses the same token as the map.

In an implementation according to one embodiment, a location-seeking mobile device scans the environment to find APs. The environment may be an enclosed structure or one not readily accessible by satellite. The mobile device may scan the environment to find visible APs or it may consult the AP server database to identify one or more APs that have substantially the same token. The mobile device may also obtain a map having a unique map token. The mobile device may then use APs that have a token matching the map token in order to calculate its position. That is, the mobile device calculates its position relative to the identified APs and the map. In one embodiment, the mobile device uses trilateration to calculate its position from ToF range measurements with the identified APs.

Figure 3:
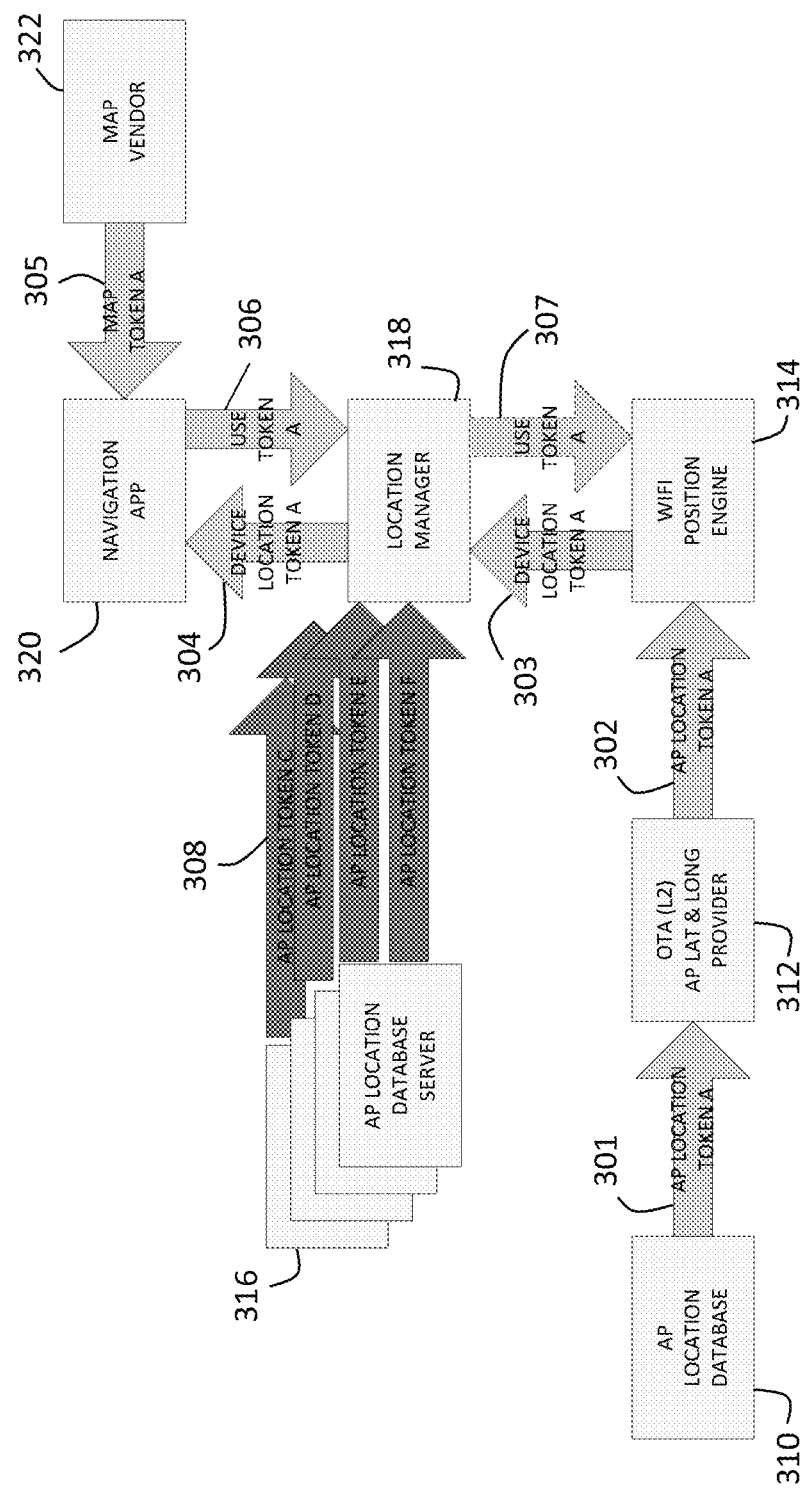
FIG. 3 illustrates an exemplary embodiment of the disclosure configured to use map tokens to eliminate misalignment.

FIG. 3 illustrates an exemplary embodiment of the disclosure configured to use map tokens to substantially eliminate or reduce misalignment. The exemplary process of FIG. 3 starts when a mobile device (not shown) seeks to identify its location at an environment. The environment may be an indoor environment, such as an office building, a hospital or a museum. Location manager 318 requests (or retrieves) AP location tokens and map tokens to associate one or more APs with the appropriate map(s). A map may share a token with an AP or it may share a token with several APs.

In an exemplary embodiment, AP location database 310 may be associated with an AP in the environment. The AP can be serving a mobile device in the environment. To determine its location in the environment, the mobile device needs to have the AP's location. In one embodiment, AP location database 310 may be integrated with the AP.

The AP location database may be transferred to the MAC layer. In the Open Systems Interconnection (OSI) communication model, the MAC layer is a sublayer of the Data Link Control layer. The MAC layer is directed to sharing the physical connection to the network among several computers, where each computer has its own unique MAC address. Each AP may have a unique MAC address which may include the AP location token. The AP location token can be any electronic token (or machine address) uniquely associated with each AP and its map. The AP location token can be configured to identify the AP, its location or some other characteristic unique to the AP.

AP location database 310 may provide the AP location token (e.g., Token A) directly to Wi-Fi position engine 314. Alternatively, it may provide the AP location token (e.g, Token A) to the AP latitude & longitude provider (AP Provider) 312 as shown by arrow 301. The information may be communicated wirelessly (OTA) between AP location database 310 and AP provider 312. AP provider 312 may also reside at the MAC layer of the network, may be configured into the AP or may be located at the network controller which configures the APs with their respective locations. In one embodiment, AP provider 312 defines a network controller.

AP location database 310 may direct the AP location token (e.g, Token A) to the Wi-Fi position engine 314 as shown by arrow 302. The Wi-Fi position engine may forward the received location information and the token to the location manager 318 as shown by arrow 303. The Wi-Fi position engine may reside on the client (e.g., on the mobile device) or it can be part of the underlying network.

As seen in the exemplary embodiment of FIG. 3, Location manager 318 may receive the AP location token from different sources. For example, Location manager 318 may receive device location token (e.g., Token A) from AP location database 310 through Wi-Fi position engine 314. Location manager 318 may also receive data from AP location database 316. The AP location database may store known AP location tokens. For example, AP location database 316 is shown to store and transmit (arrow 308) AP location tokens, C, D, E and F. AP location database server 316 may reside at an external server for storing location information and location tokens for all APs in an environment. The stored information may also include location maps which may or may not match to the original vendor maps.

Location manager 318 may search information from database server 316 to identify an AP location token to substantially match the AP and the appropriate map. If not found, location manager 318 may use device location token provided by AP location database 310 (i.e., Token A).

In another embodiment, Navigation app 320 can maintain a dataset of tokens and advise Location manager 318 as to which token to use as shown by arrow 306. Navigation app 320 may determine the appropriate AP token based on the information received from Location manager 318 (arrow 304) as to the location of the AP (e.g., AP lat. and long. information). Once the AP location token is confirmed against the appropriate map, Location manager 318 can instruct Wi-Fi position engine 314 to use Token A with the particular AP (as shown with arrow 307). In this manner, the Wi-Fi position engine 314 can seek and identify only APs having matching AP location token which may come from the lower network layers.

In still another embodiment of the disclosure, Location manager 318 and Navigation app 320 may confer and select the map that can identify the location of the most number of APs. For example, Map vendor 322 may provide several maps to Navigation app 320 (see arrow 305). Each map may provide locations to one or more APs. The Location manager and the Navigation app may select the map identifying the most number of APs. The token for the selected map can then be directed to Wi-Fi engine 314 to identify the APs having similar tokens.

In the exemplary embodiment of FIG. 3 only the layer 2 (L2) AP assisted data has the same token as the map vendor. Therefore, it is the only AP location provider aligned to the map. The exclusivity provides various capabilities to different entities in the chain. First, Location manager 318 may request for the coordinates of a specific AP based on the token it receives from the Navigation app 320. Second, Navigation app 320 can have a database of tokens and the knowledge to convert between one set of coordinates to another. Third, AP location vendor 322 may hold a number of sets of coordinates to support different map vendors.

In still another embodiment, the token may be used to add security to the AP location database 310. This is particularly suitable at a venue where there is an interest in concealing the real position of the APs from some or all patrons. In this embodiment, AP location database 310 may provide AP locations which are overridden with a known error. The AP location error may be selected to make the resulting device location error predictable for an entity with the knowledge of the location model. The token may be used to provide a model of the error, which Navigation app 320 can then use to correct the coarse location calculated by Location manager 318 based on the coarse AP data.

Figure 4:
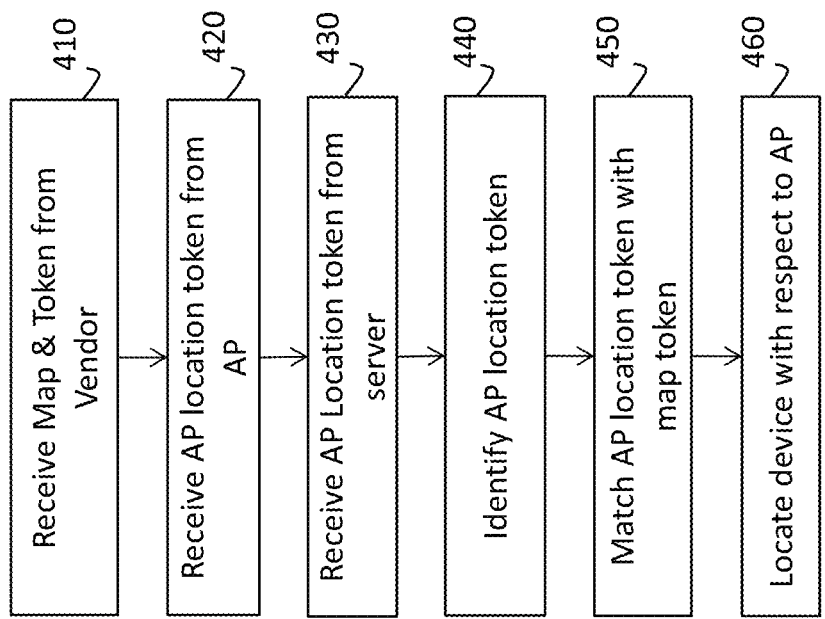
FIG. 4 is an exemplary flow diagram for implementing an embodiment of the disclosure.

FIG. 4 is an exemplary flow diagram for implementing an embodiment of the disclosure. The flow diagram of FIG. 4 starts at step 410 when the map vendor provides map tokens for APs of an environment. Each map token may be configured to associate with one or more APs in the environment. Each map may contain pinpoint location for each of the covered APs.

At steps 420 and 430, AP token information is received from the AP and AP server, respectively. In one embodiment, one of the AP or the AP sever provides the requisite AP token. Therefore, one of steps 420 and 430 may be unnecessary and optional. AP server may comprise an AP location database containing information for all APs in the environment.

At step 440 the appropriate AP location token is selected. This step may require selecting several APs all sharing the same AP location token. The APs may be selected on the basis of their proximity to the mobile device. At step 450, the selected AP location token(s) are matched against the map tokens received from the vendor (see step 410). Once the map (or maps) are identified, then the AP locations can be pinpointed. Finally, at step 460 the mobile device's location is determined based on the AP locations.

Figure 5:
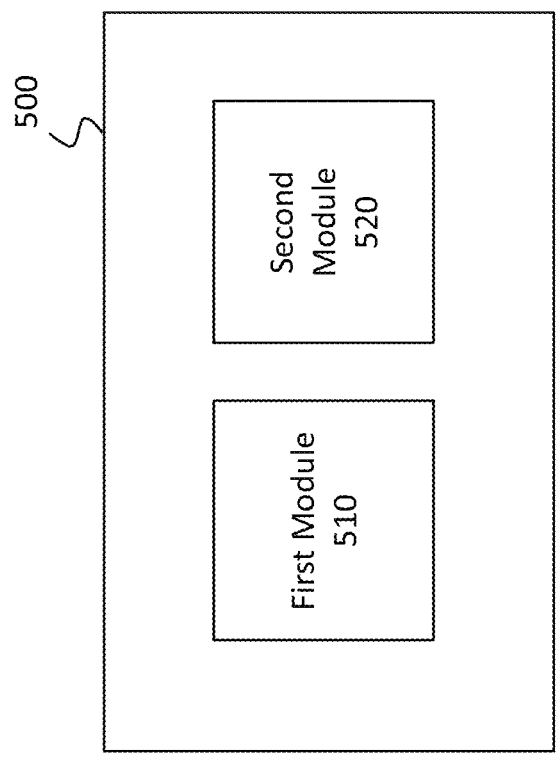
FIG. 5 shows an apparatus to locate a mobile device in an environment.

FIG. 5 shows an exemplary device to locate a mobile device in an environment. The environment may comprise an indoor environment or an environment not readily accessible by GPS satellites. Specifically, FIG. 5 shows device 500 which may be an integral part of a larger system or can be a stand-alone unit. For example, device 500 can define a system-on-chip configured to implement the disclosed methods. Device 500 may also be part of a larger system having multiple antennas, a radio and a memory system. Device 500 may be define a software or an application. In one embodiment, device 500 defines an AP (or mobile device) location determination engine.

Device 500 includes first module 510 and second module 520. Modules 510 and 520 may be hardware, software or a combination of hardware and software (i.e., firmware). Further, each of modules 510 and 520 may define one or more independent processor circuits. In an exemplary embodiment, at least one of modules 510 or 520 includes a processor circuitry and a memory circuitry in communication with each other. In another embodiment, modules 510 and 520 may define different parts of the same data processing circuit. In another exemplary embodiment, device 500 may be integrated with an AP or with a server.

In one embodiment, first module 500 may be configured to receive a plurality of maps. The maps may be provided from an external server (e.g., cloud-based server) or may be from a memory accessible to module 510. Each map may have a unique map token. Thus, module 510 may also receive a plurality of map tokens with each of the respective plurality of maps. Module 510 may be further configured to receive location information from a first AP. The location information may include a first AP location token.

Second module 520 may communicate with first module 510. Second module 520 may match the first AP token with one of the plurality of map tokens to identify a map associated with the AP location token and to locate the first AP with respect to the identified map.

In another embodiment, the first module may be further configured to receive a plurality of known AP location tokens from an AP location database. Each of the known AP location tokens may correspond to a known AP. The second module may then be configured to match the first AP location token with one of the known AP location tokens to identify location of the first AP. In addition, the second module may be further configured to locate a mobile device in relation to the first AP.

In still another embodiment, the first module may be configured to receive a second AP location information including a second AP location token and the second module may be configured to match the second AP location token with one of the plurality of map tokens or the known AP location tokens to identify a location associated with the second AP. In yet another embodiment, the first module may be configured to receive latitude and longitude information for the first AP to enhance location determination.

FIG. 6 shows a system for implementing an embodiment of the disclosure. For example, the steps of any of the above-disclosed flow diagrams may be implemented at the system of FIG. 6. System 600 of FIG. 6 may define a mobile device such as an AP, a router, smartphone, a tablet or any device capable of wireless communication. System 600 may also define a stationary device, for example, as part of a network. System 600 may include one or more antennas 640 such that different signals for different protocols can be received at different antennas. If a signal is received at system 600, it may be relayed to radio 620. Radio 620 may include transceiver components such as front-end receiver components or a receiver/transmitter. Although not shown, system 600 may be connected to a WLAN or the interne backbone.

Processor 630 may receive data from an external device. The data may include AP location token and map tokens. Processor 630 may include one or more modules as discussed in relation to FIG. 5. Processor 630 may also communicate with memory circuit 640. While shown as a separate circuitry in the exemplary system of FIG. 6, it should be noted that instructions 642 may be embedded on processor 630 as firmware to obviate the addition of memory circuit 640.

Memory circuit 640 may contain instructions 642 for processor 730 to implement one or more of the steps of the exemplary methods disclosed herein. Memory circuit 640 may define a tangible, non-transitory, computer readable medium containing a set of instructions to cause processor 630 to perform a process including: receive a plurality of maps and a plurality of map tokens, each of the plurality of map tokens associated with one of the plurality of maps; receive location information from a first access point (AP), the location information including a first AP token; match the first AP token with one of the plurality of map tokens to identify a map associated with the location token; and locate the first AP with respect to the identified map.

In one embodiment, system 600 may be configured as a system to locate a mobile device in an environment. The system may include one or more antennas 640; a radio 620; a memory 640 and processor 620 to communicate with the memory 640 and radio 620. The processor 630 may include a first module (510, FIG. 1) to receive a plurality of maps and a plurality of map tokens, each map token associated with a respective one of the plurality of maps, the first module configured to receive location information from a first access point (AP), the location information including a first AP location token; and a second module (520, FIG. 2) to match the first AP location token with one of the plurality of map tokens to identify a map associated with the first AP and to locate the first AP with respect to the identified map. System 600 of FIG. 6, may be implemented as a system-on-chip including one or more radios, but excluding the antenna(s).

The following examples pertain to further embodiments of the disclosure. Example 1 relates to an apparatus to locate a mobile device in an environment, comprising: a first module to receive a plurality of maps and a plurality of map tokens, each map token associated with a respective one of the plurality of maps, the first module configured to receive location information from a first access point (AP), the location information including a first AP location token; and a second module to match the first AP location token with one of the plurality of map tokens to identify a map associated with the first AP and to locate the first AP with respect to the identified map.

Example 2 relates to the apparatus of example 1, wherein the first module further receives a plurality of known AP location tokens from an AP location database, each of the known AP location tokens corresponding to a known AP.

Example 3 relates to the apparatus of example 1, wherein the second module is further configured to match the first AP location token with one of the known AP location tokens to identify a location for the first AP.

Example 4 relates to the apparatus of example 1, wherein the second module is further configured to locate a mobile device in relation to the first AP.

Example 5 relates to the apparatus of example 2, wherein the first module is further configured to receive a second AP location information including a second AP location token.

Example 6 relates to the apparatus of example 5, wherein the second module is further configured to match the second AP location token with one of the plurality of map tokens to identify a location associated with the second AP.

Example 7 relates to the apparatus of example 1, wherein the first module is configured to receive latitude and longitude information for the first AP.

Example 8 relates to a system to locate a mobile device in an environment, comprising: one or more antennas; a radio; a memory; a processor to communicate with the memory and the radio, the processor having: a first module to receive a plurality of maps and a plurality of map tokens, each map token associated with a respective one of the plurality of maps, the first module configured to receive location information from a first access point (AP), the location information including a first AP location token; and a second module to match the first AP location token with one of the plurality of map tokens to identify a map associated with the first AP and to locate the first AP with respect to the identified map.

Example 9 relates to the system of example 8, wherein the first module further receives a plurality of known AP location tokens from an AP location database, each of the known AP location tokens corresponding to a known AP.

Example 10 relates to the system of example 8, wherein the second module is further configured to match the first AP location token with one of the known AP location tokens to identify a location for the first AP.

Example 11 relates to the system of example 8, wherein the second module is further configured to locate a mobile device in relation to the first AP.

Example 12 relates to the system of example 9, wherein the first module is further configured to receive a second AP location information including a second AP location token.

Example 13 relates to the system of example 12, wherein the second module is further configured to match the second AP location token with one of the plurality of map tokens to identify a location associated with the second AP.

Example 14 is directed to a method to locate a mobile device, comprising: receiving, at a location server, a plurality of maps and a plurality of map tokens, each of the plurality of map tokens associated with one of the plurality of maps; receiving location information from a first access point (AP), the location information including a first AP location token; matching the first AP location token with one of the plurality of map tokens to identify a map associated with the location token; and locating the mobile device with respect to the first AP and the identified map.

Example 15 relates to the method of example 14, further comprising receiving a plurality of known AP location tokens from an AP location database, each of the known AP location tokens corresponding to a known AP.

Example 16 relates to the method of example 15, further comprising matching the first AP location token with one of the known AP location tokens to identify a location for the first AP.

Example 17 relates to the method of example 14, further comprising locating a mobile device in relation to the first AP.

Example 18 relates to the method of example 15, further comprising receiving a second AP location information including a second AP location token and matching the second AP location token with one of the plurality of map tokens or the known AP location tokens to identify a location associated with the second AP.

Example 19 relates to the method of example 18, further comprising locating the mobile device with respect to the first AP and the second AP.

Example 20 relates to the method of example 18, further comprising receiving latitude and longitude information for at least one of the first AP or the second AP.

Example 21 relates to a tangible computer-readable storage device containing a set of instructions to cause a computer to perform a process comprising: receive a plurality of maps and a plurality of map tokens, each of the plurality of map tokens associated with one of the plurality of maps; receive location information from a first access point (AP), the location information including a first AP token; match the first AP token with one of the plurality of map tokens to identify a map associated with the location token; and locate the first AP with respect to the identified map.

Example 22 relates to the tangible computer-readable storage device of example 21, wherein the instructions further cause the computer to receive a plurality of known AP location tokens from an AP location database, each of the known AP location tokens corresponding to a known AP.

Example 23 relates to the tangible computer-readable storage device of example 22, wherein the instructions further cause the computer to match the first AP token with one of the known AP location tokens to identify a location for the first AP.

Example 24 relates to the tangible computer-readable storage device of example 21, wherein the instructions further cause the computer to locate a mobile device in relation to the first AP.

Example 25 relates to the tangible computer-readable storage device of example 22, wherein the instructions further cause the computer to receive a second AP location information including a second AP token and matching the second AP token with one of the plurality of map tokens or the known AP location tokens to identify a location associated with the second AP.

While the principles of the disclosure have been illustrated in relation to the exemplary embodiments shown herein, the principles of the disclosure are not limited thereto and include any modification, variation or permutation thereof.

What is claimed is:

1. An apparatus to locate a mobile device in an environment, comprising:
a first module to receive a plurality of maps and a plurality of map tokens, each map token associated with a respective one and only one of the received plurality of maps, the first module configured to receive location information from a first access point (AP), the location information including a first AP location token; and
a second module to match the first AP location token with at least one of the plurality of map tokens to identify a map associated with the first AP and to locate the first AP with respect to the identified map;
wherein the first AP location token further comprises a unique pseudo random number seeded in a Media Access Control (MAC) address of the AP and wherein the first AP location token is the same for both the map and the associated AP.

2. The apparatus of claim 1, wherein the first module further receives a plurality of known AP location tokens from an AP location database, each of the known AP location tokens corresponding to a known AP.

3. The apparatus of claim 1, wherein the second module is further configured to match the first AP location token with one of the known AP location tokens to identify a location for the first AP.

4. The apparatus of claim 1, wherein the second module is further configured to locate a mobile device in relation to the first AP.

5. The apparatus of claim 2, wherein the first module is further configured to receive a second AP location information including a second AP location token.

6. The apparatus of claim 5, wherein the second module is further configured to match the second AP location token with one of the plurality of map tokens to identify a location associated with the second AP.

7. The apparatus of claim 1, wherein the first module is further configured to receive latitude and longitude information for the first AP.

8. A system to locate a mobile device in an environment, comprising:
one or more antennas;
a radio;
a memory;
a processor to communicate with the memory and the radio, the processor having:
a first module to receive a plurality of maps and a plurality of map tokens, each map token associated with a respective one and only one of the received plurality of maps, the first module configured to receive location information from a first access point (AP), the location information including a first AP location token; and
a second module to match the first AP location token with one of the plurality of map tokens to identify a map associated with the first AP and to locate the first AP with respect to the identified map;
wherein the first AP location token further comprises a pseudo random number seeded in a Media Access Control (MAC) address of the AP and wherein the first AP location token is the same for both the map and the associated AP.

9. The system of claim 8, wherein the first module further receives a plurality of known AP location tokens from an AP location database, each of the known AP location tokens corresponding to a known AP.

10. The system of claim 8, wherein the second module is further configured to match the first AP location token with one of the known AP location tokens to identify a location for the first AP.

11. The system of claim 8, wherein the second module is further configured to locate a mobile device in relation to the first AP.

12. The system of claim 9, wherein the first module is further configured to receive a second AP location information including a second AP location token.

13. The system of claim 12, wherein the second module is further configured to match the second AP location token with one of the plurality of map tokens to identify a location associated with the second AP.

14. A method to locate a mobile device, comprising:
receiving, at a location server, a plurality of maps and a plurality of map tokens, each of the plurality of map tokens associated with one of the plurality of maps;
receiving location information from a first access point (AP), the location information including a first AP location token;
matching the first AP location token with one and only one of the plurality of map tokens to identify a map associated with the location token; and
locating the mobile device with respect to the first AP and the identified map;
wherein the first AP location token further comprises a pseudo random number seeded in a Media Access Control (MAC) address of the AP and wherein the first AP location token is the same for both the map and the associated AP.

15. The method of claim 14, further comprising receiving a plurality of known AP location tokens from an AP location database, each of the known AP location tokens corresponding to a known AP.

16. The method of claim 15, further comprising matching the first AP location token with one of the known AP location tokens to identify a location for the first AP.

17. The method of claim 14, further comprising locating a mobile device in relation to the first AP.

18. The method of claim 15, further comprising receiving a second AP location information including a second AP location token and matching the second AP location token with one of the plurality of map tokens or the known AP location tokens to identify a location associated with the second AP.

19. The method of claim 18, further comprising locating the mobile device with respect to the first AP and the second AP.

20. The method of claim 18, further comprising receiving latitude and longitude information for at least one of the first AP or the second AP.

21. A tangible non-transitory computer-readable storage device containing a set of instructions to cause a computer to perform a process comprising: receive a plurality of maps and a plurality of map tokens, each of the plurality of map tokens associated with one and only one of the plurality of maps; receive location information from a first access point (AP), the location information including a first AP location token; match the first AP location token with one of the plurality of map tokens to identify a map associated with the first AP location token; and locate the first AP with respect to the identified map;
wherein the first AP location token further comprises a pseudo random number seeded in a Media Access Control (MAC) address of the AP and wherein the first AP location token is the same for both the map and the associated AP.

22. The tangible non-transitory computer-readable storage device of claim 21, wherein the instructions further cause the computer to receive a plurality of known AP location tokens from an AP location database, each of the known AP location tokens corresponding to a known AP.

23. The tangible non-transitory computer-readable storage device of claim 22, wherein the instructions further cause the computer to match the first AP location token with one of the known AP location tokens to identify a location for the first AP.

24. The tangible non-transitory computer-readable storage device of claim 21, wherein the instructions further cause the computer to locate a mobile device in relation to the first location AP and the map associated with the first AP.

25. The tangible non-transitory computer-readable storage device of claim 22, wherein the instructions further cause the computer to receive a second AP location information including a second AP location token and matching the second AP location token with one of the plurality of map tokens or the known AP location tokens to identify a location associated with the second AP.

\* \* \* \* \*